Figure 1:
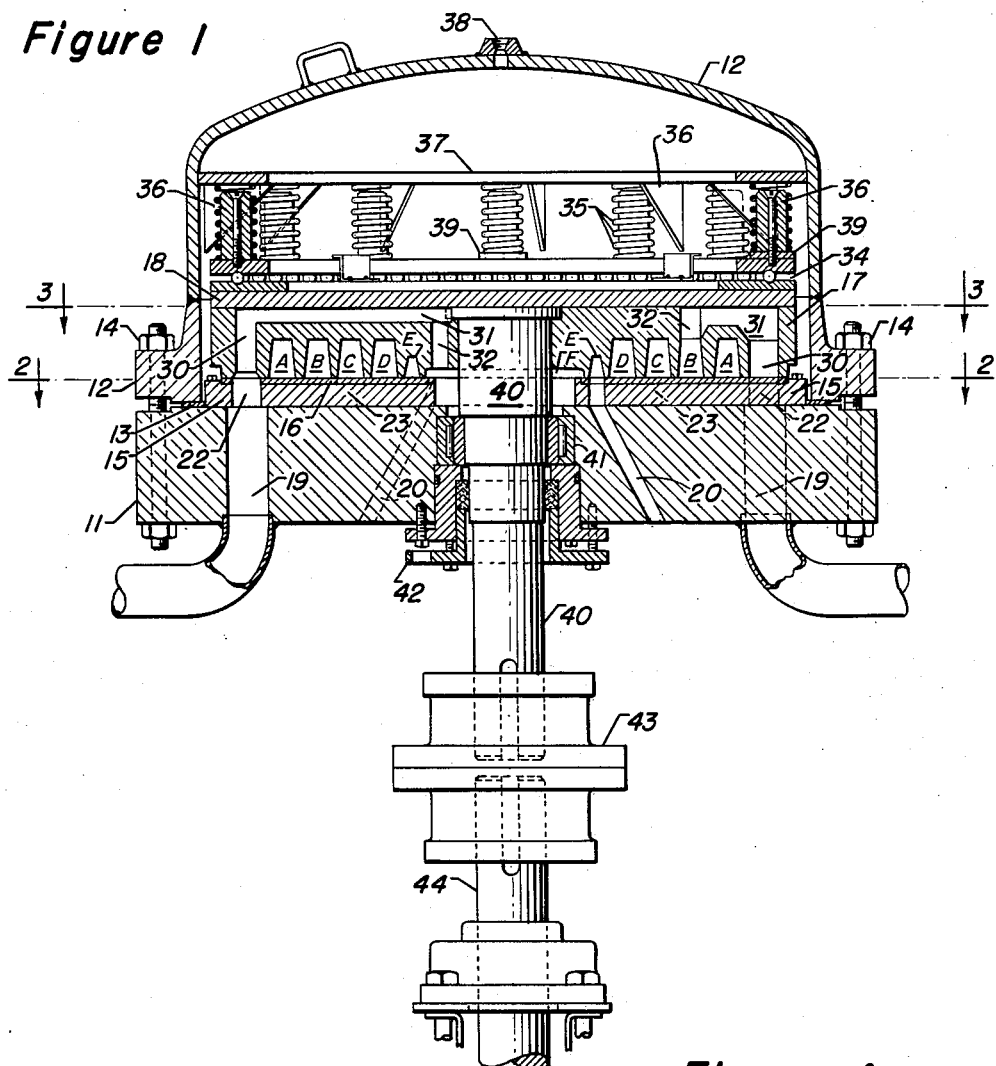

June 26, 1962  D. B. CARSON ETAL  3,040,777
ROTARY VALVE
Filed April 10, 1959  2 Sheets-Sheet 1

INVENTORS:
Don B. Carson
Frank V. Purse

BY:
Chester J. Giuliani
Philip T. Liggett
ATTORNEYS

June 26, 1962  D. B. CARSON ETAL  3,040,777
ROTARY VALVE
Filed April 10, 1959  2 Sheets-Sheet 2

INVENTORS:
Don B. Carson
Frank V. Purse
BY: Chester J. Giuliani
Philip F. Leggett
ATTORNEYS

United States Patent Office 3,040,777
Patented June 26, 1962

3,040,777
ROTARY VALVE
Don B. Carson, Mount Prospect, and Frank V. Purse, Skokie, Ill., assignors to Universal Oil Products Company, Des Plaines, Ill., a corporation of Delaware
Filed Apr. 10, 1959, Ser. No. 805,575
14 Claims. (Cl. 137—625.15)

This invention relates to a rotary distributing valve for effecting the transfer of a fluid stream from one conduit to any of a plurality of other conduits, and, more particularly, it relates to a rotary multiport valve by which a multiplicity of fluid streams may be simultaneously and individually connected to a plurality of process conduits according to a periodic sequence determined by the valve construction.

The utility of multiport valves in the cyclic control of batch or continuous flow processes has long been recognized. Relatively simple multiport valves, usually three-way or four-way manual or solenoid-operated valves, are widely encountered in such apparatus as regenerative air dryers, hydraulic piston actuators, automatic sampling systems for process stream analyzers, sequential programming networks for pneumatic or hydraulic final control elements, emergency drop-out valves, underride or override control systems, and the like. Larger three-way and four-way valves find extensive use in gas and oil transmission lines, regenerative catalytic reforming processes, "make-and-blow" gas production processes, etc. Such valves possess an obvious economic advantage in that one multiport valve can replace two or more suitably manifolded dual port valves. Another benefit of the multiport valve is that the interconnection of the various streams is positively fixed regardless of the number of degrees of freedom of the valve; there is no danger of inadvertent mixing of the wrong streams through misoperation, as there would inherently be in the case of a complex manifold of individual shutoff valves. In general, a multiport valve may be advantageously employed wherever the flow pattern of a particular process must exist in two or more distinct states and be periodically varied therebetween.

Multiport distributing valves of the prior art derive from two basic structures: the rotary plug valve and the rotary or linear slide valve. The rotary plug valve, a refinement of the laboratory plug cock, comprises a tapered plug rotatably assembled within a body having a longitudinal bore adapted to receive the plug in fluid-tight contact therewith; a plurality of ports are spaced around the body and the plug contains fluid passageways which connect different combinations of ports for different angular positions of the plug. The slide valve comprises two flat surfaces maintained in fluid tight contact; one surface, containing channels or grooves, rotates on or moves in a reciprocating motion relative to the other surface which contains a number of ports. Distributing valves of both types are generally capable of channeling only a limited number of fluid streams. Such valves have only a few adjusted positions of the moving member, and for any one of these positions one or more pairs of body ports are brought into communication. The body ports constitute a single set of conduits and whatever combinations are possible therebetween are necessarily confined to conduits within that set. Heretofore there has been no satisfactory valve design which will permit the interconnection of two independent sets of conduits such that each conduit of the first set may be brought into individual communication with every conduit of the second set. A valve embodying this feature would be highly desirable for any process in which it is necessary to pass several different fluids through each of a plurality of conduits cyclically and in a predetermined sequence.

A specific example of such a process is a selective adsorption process wherein one hydrocarbon type is separated from a stream containing a mixture of hydrocarbons by means of a selective adsorbent. Specifically, selective adsorbents such as those known as molecular sieves, which are aluminum silicates, may be used to selectively remove normal hydrocarbons from iso- or branched-chain hydrocarbons. The operation may be readily effected by passing a mixture of iso and normal hydrocarbons over the adsorbent whereby the normal hydrocarbon is adsorbed by the sieves and an effluent stream of substantially pure iso hydrocarbons is recovered. When it is desired to make a continuous process of this selective quality, it is necessary, in order to reuse the sieves and to recover the normal product, to desorb the normal hydrocarbon from the sieves. This can be accomplished by subjecting the normal hydrocarbon saturated sieves to the influence of a preponderantly greater quantity of desorbent which is preferably a material capable of displacing the normal hydrocarbon from the sieves and which is readily separable from the normal hydrocarbon by fractional distillation.

A continuous process for separating iso from normal paraffins may be effected by employing a moving bed of adsorbent which passes downwardly as a column from an adsorption zone wherein it countercurrently contacts a rising stream of mixed iso and normal hydrocarbons, thereby adsorbing the normal, to a desorption zone immediately below the feed point wherein the bed is contacted with a desorbent. A suitable column may have an intermediate feed point for the iso-normal mixture and a lower feed point for the desorbent operated in conjunction with an upper take-off point for a mixture of iso hydrocarbons and desorbent in a take-off point immediately below the feed point for removing a mixture of normal hydrocarbons and desorbent. The molecular sieves discharged from the bottom of the column must be lifted to the top and again begin their descent to produce the effect of a continuously moving column passing downwardly through all zones. Although this system is very desirable because it yields a continuous product and it may be operated as a continuous process, it is very difficult to carry out in practice because the molecular sieves are physically fragile and soon destroyed by the strains involved in a moving bed process.

It has been found that a process yielding a continuous product can be obtained by maintaining the molecular sieves as a series of small fixed beds and, in effect, moving the feed and take-off points past the bed instead of vice versa. For example, if a column of molecular sieves is divided into a series of small beds or zones and each bed is fitted with a feed conduit for iso-normal paraffin mixture and another for desorbent as well as take-off conduits for isoparaffin and normal paraffin, by systematically varying the material passing into and out of each bed through a regular sequence, the same effect can be achieved as when a moving bed is employed but without the physical strain on the sieves. The greater the number of small beds used, the closer to continuity the process becomes and it has been found that from about 10 to about 30 small beds produce a result indistinguishable from a continuous process with regard to product composition.

If this process is carried out using the above-described apparatus, that is, a series of beds each having four conduits connected thereto, an automatic gate valve must be placed in each conduit so that the conduits may function in sequence at the appropriate time. In addition, there must be an elaborate sequential control system comprising a timer, relay, interlock switches, etc. for programming the valves to open and close in the proper sequence and at the proper time so that only one material will be directed to or conducted from any bed at any time and all switching of fluid streams will be accomplished at the right instant to avoid reversal of flow or mixing of streams. Consequently, in a 24 bed adsorption process of the class described, it would be necessary to provide 96 automatic gate valves, 96 conduits, and a complex electrical control system. It is immediately apparent, therefore, that the inherent advantages of this operating technique which, in a broad sense, can be employed to realize the benefits of a moving bed process using any fixed bed contactor, would be largely defeated by the practical disadvantages involved in first cost, maintenance, and unreliability of such a complex assemblage of apparatus. However, by employing a specific embodiment of the distributing valve of this invention, it is possible to eliminate all 96 gate valves by incorporating their function in a single mechanical valve, to reduce the number of conduits required from 96 to 24, and to greatly simplify the requisite control system.

It is, therefore, a principal object of this invention to provide a unitary mechanical valve which will permit the interconnection of two independent sets of conduits such that each conduit of the first set comes into individual communication with every conduit of the second set according to a predetermined sequence upon traversal of all adjusted positions of the valve.

Another object of this invention is to provide a rotary multiport valve having a substantially flat seating surface whereby cross-port leakage, that is, unintended fluid flow between two or more ports, is effectively eliminated.

A further object of this invention is to provide a rotary multiport valve having a unique seating device that serves the double function of supplying an easily adjustable seating force and also sealing the ports against extra-port leakage, that is, fluid flow from any port to the atmosphere. These and other objects of the invention will be apparent, to one skilled in the art, from the accompanying disclosure and discussion.

It is an embodiment of this invention to provide a valve comprising a stator having a substantially flat seating surface, a rotor having a seating surface in fluid-tight contact with the stator seating surface, a plurality of concentric grooves formed in either the stator seating surface or the rotor seating surface, a plurality of slots or openings in the rotor seating surface spaced around the axis of rotation of the rotor, passageways within the rotor each extending from one of said openings to one of said grooves, a plurality of ports extending through the stator and spaced around said axis of rotation so that each of the ports is in communiction with each of said openings at some point in the rotation of the rotor and each opening is in communication with only one port for any adjusted position of the rotor, and means for conveying fluid from each of said grooves through the stator to the exterior thereof.

It is a specific embodiment of this invention to provide a rotary distributing valve comprising a rotor having a conically tapered seating surface, a stator having a substantially flat seating surface adjacent and conformable to the tapered seating surface of the rotor, a lining of solid autolubricant affixed to said flat surface, a casing enclosing the rotor and maintained in fluid-tight contact with the stator, said casing having a perforation through which a fluid under pressure is introduced, an annular thrust bearing attached to the face of said rotor opposite said tapered seating surface, a plurality of circumferentially spaced springs under compressive stress disposed between said casing and said thrust bearing, the combination of the fluid pressure within said casing and the thrust of the springs applying to said rotor and maintaining thereon a seating force normal to said flat seating surface and of such magnitude that the rotor bears upon said flat surface through said lining and causes resilient deformation of the flat surface to bring the lining into fluid-tight contact with said tapered seating surface, a plurality of concentric grooves formed in the tapered surface, a plurality of openings in the tapered surface spaced around the axis of rotation of the rotor, passageways within the rotor each connecting one of said grooves with one of said openings, a plurality of ports extending through said stator and lining and spaced around said axis of rotation so that each of the ports is in fluid flow communication with each of said openings at some point in the rotation of the rotor and each opening is in fluid flow communication with only one port for any adjusted position of the rotor, said openings having such shape, size, and position that for any unadjusted position of the rotor each opening is in fluid flow communication with at least one port, and a conduit extending from each of said grooves in the rotor seating surface through said lining and stator to the exterior thereof.

Figure 4:
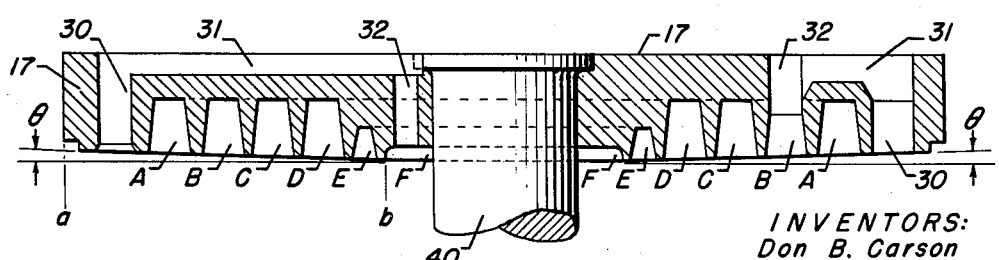
Figure 2:
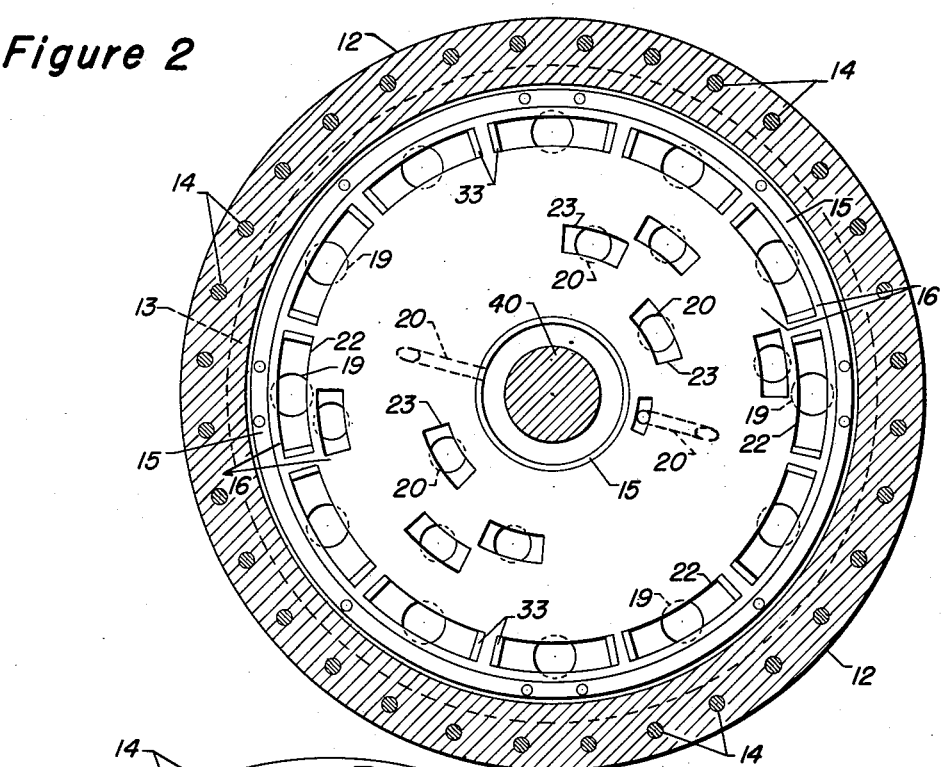
Figure 3:
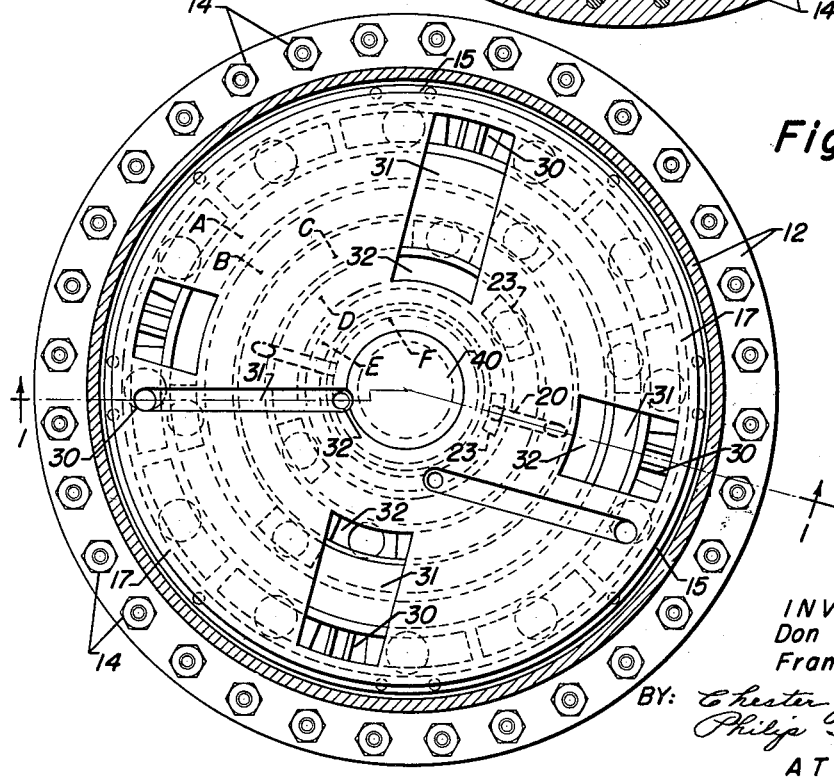

A preferred embodiment of the present invention is shown in the accompanying drawings which, together with the description thereof, will serve to exemplify the invention. Various modifications of the particular structure illustrated can be made by those skilled in the art without departing from the broad scope of the invention. FIGURE 1 illustrates a sectional elevation view of the assembled valve including various mechanical refinements thereto, said section being taken along line 1—1 of FIGURE 3. FIGURE 2 is a sectional plan view of the valve taken along line 2—2 of FIGURE 1. FIGURE 3 is a sectional plan view of the valve taken along line 3—3 of FIGURE 1. FIGURE 4 illustrates a preferred means for obtaining a fluid-tight bearing surface.

Referring now to FIGURE 1, the valve essentially comprises a lower plate or stator 11, a rotor 17 maintained in fluid-tight contact therewith and free to rotate in a horizontal plane, and an upper pressure-tight shell or casing 12. Casing 12 is held in fluid-tight contact with the stator by any suitable means; preferably the bearing surface of the casing is provided with a raised face sealed by gasket 13, and a plurality of spaced bolts 14 rigidly secures the casing to the stator. Alternatively the casing may be attached by means of compression clips or may even be welded to the stator, although this would be undesirable from the standpoint of maintenance. The casing and the stator therefore comprise a fluid-tight housing totally enclosing rotor 17 which, by means to be hereinafter described, is maintained in fluid-tight contact with the stator seating surface.

Removably attached to the upper surface of stator 11 is a flat, annular seating plate 15 to which is bonded, on the seating surface thereof, a sheet or lining 16 of a solid, deformable material preferably having self-lubricating properties; suitable materials therefor include "Teflon," "Teflon"-impregnated glass cloth, "Kel-F", or other fluorocarbons, graphite, nylon, polyethylenes, etc. In addition to solid autolubricant materials, it is contemplated that other compositions such as buna rubber, "Bakelite" or other vinyl resins, ceramics, etc., may be used if desired. The innermost and outermost portions of annular seating plate 15 are preferably slightly raised above the surface of the plate but are terminated below the upper surface of lining 16, thereby providing a rigid enclosure for the lining and preventing shearing or tearing of the lining during movement of the rotor. However, it is within the scope of this invention to omit such lining altogether since, in some applications, it is desirable to have a metal-to-metal bearing surface between rotor and stator. Seating plate 15 is provided solely to permit simple and quick replacement of the lining and may be dispensed with, if desired, whether or not a lining is furnished. For the purpose of this invention the seating plate may be considered integral with, or a part of, the stator; in any event the essential requirement of the stator seating surface is that it be substantially flat.

A plurality of ports 19 extends through stator 11 and these ports are spaced on an outermost circle centered on the axis of rotation of the rotor, as shown in FIGURE 1 and more clearly illustrated in the plan view of FIGURE 2. A like number of contiguous ports 22 extends through seating plate 15 thereby forming a plurality of circumferentially spaced ports extending from the lower exterior of the stator to the seating surface thereof. Ports 19 or 22 may have circular, square, or rectangular cross sections or may be irregularly shaped. In the present embodiment of this invention ports 22 are preferably in the form of slots or curvilinear rectangles, which design is conservative of space and minimizes the stator diameter for a given number of ports. In order to further protect lining 16 from shearing or tearing effects during rotation, it is desirable to provide the ends of ports 22 with a raised face 33, as shown in FIGURE 2, which raised portions terminate below the upper surface of the lining and ordinarily remain out of contact with the rotor until the lining should become substantially worn down. There is a second group of ports, hereinafter designated as conduits 20 to distinguish from ports 19, which extend through stator 11 and are spaced singly or doubly on various concentric circles interior to ports 19. An extension of conduits 20 through seating plate 15 is provided via slots 23 therein in the same manner as ports 22 serve to extend ports 19. In the specific embodiment shown in FIGURE 2, the innermost conduit 20 is not provided with a horizontally elongated slot through the seating plate because of space limitations, but it is not necessary to the invention that any of conduits 20 have rectangular slots specifically or cross sections of any special nature generally. The two innermost conduits 20 slant downwardly and outwardly away from shaft 40, the reason therefor being that the available space in the central region of stator 11 is needed to accommodate bearing 41 and stuffing box 42, as hereinafter described, and there is not room for these two innermost conduits to be extended straight downwardly through the stator, as are the remaining outer conduits 20.

Referring again to FIGURE 1, the seating surface of rotor 17 contains a plurality of concentric grooves which are centered on the axis of rotation of the rotor; in the particular embodiment of the valve illustrated there are six such grooves A, B, C, D, E and F. There is provided in the rotor seating surface a like number of openings 30 which are spaced on a circle exterior to the grooves and are substantially the same distance from the axis of rotation as are ports 22 in the seating plate. Each of the grooves A, B, C, D, E, F is connected to an opening 30 through a horizontal channel 31 within the rotor and a vertical channel 32, forming a U-shaped passageway by which each groove is in unbroken communication with an opening 30. In FIGURE 1 two such passageways are visible; groove F connects with opening 30 on the left of the section and groove B connects with another opening 30 on the right. In the plan view of FIGURE 3 all six passageways are visible, and, as illustrated, they may extend radially or tangentially outward from each groove to the outer respective opening 30. As a matter of practical construction channels 31 and 32 are machined into the upper face of rotor 17, and a rotor cap plate 18, visible in FIGURE 1, is securely attached by any suitable means to the top of rotor 17 thereby sealing off the channels and preventing leakage therebetween. However, it will be apparent to those skilled in the art that the rotor, together with grooves, openings, and channels, may be fashioned in one piece, as by casting, and for the purpose of this invention rotor 17 and rotor cap plate 18 may be considered as a unitary rotor element. Openings 30 may be in the form of curvilinear rectangles adapted to coincide with ports 22, but in general they can be of any convenient shape or cross section. The essential relationship between ports 22 and openings 30 is that for every port there will exist an adjusted position of the rotor such that each opening 30 is in fluid communication with only one port 22; for example, in a valve having twenty-four ports 22 and six openings 30 there will be twenty-four adjusted positions of the rotor whereby for every position each of the six openings 30 communicates with only one port 22.

As hereinabove described, slots 23 of seating plate 15, which communicate with the exterior of stator 11 via conduits 20, are disposed at varying distances from the axis of rotation, that is, slots 23 are spaced on various concentric circles centered thereon. The radial spacing of slots 23 is such that at least one slot and, therefore, at least one conduit 20, is in continuous communication with a rotor groove irrespective of the annular position of the rotor. If deemed necessary two or more conduits 20, which will be manifolded together by pipe means external to the valve or by conduit means within the stator itself, may communicate with a particular rotor groove; as shown in FIGURES 2 and 3 the four outermost grooves A, B, C and D each have two conduits 20 communicating therewith, which conduits are spaced 180° apart, but may be spaced as little as 90° apart. The purpose of this feature is to minimize the pressure drop through the groove which, under some conditions, may become excessive, particularly in the case of grooves having a relatively long circumferential path length.

In view of the description thus far it is evident that each of the conduits 20 is in continuous fluid communication with a corresponding rotor groove at any position of the rotor, that each groove is brought into individual fluid communication with every port 19 upon traversal of all adjusted positions of the rotor, and that every port 19 not instantly connected to a groove is dead-ended. Viewing ports 19 as being connected to a first set of process conduits and conduits 20 as being connected to a second independent set of process conduits, the valve of this invention enables each conduit of one set to be individually connected to every conduit of the other set during one complete revolution of the rotor. For example, with a valve having twenty-four ports 19 and six conduits 20, there result one hundred and forty-four different combinations of conduits during one revolution of the rotor. It should be noted further that there is no interconnection within the valve between conduits of one set, and none is intended, for if such were the case it would mean that the various contacting beds or other process elements to which the valve is connected would be bypassed or short-circuited. It is also within the scope of this invention to so proportion and place the shape, size and position of openings 30 in the rotor seating surface that for any unadjusted position of the rotor each opening 30 is in communication with at least one port 22; one manner of achieving this object is to make the length of openings 30 greater than the corresponding distance between any two adjacent ports 22, as shown in the plan view of FIGURE 3. Consequently as the rotor advances from one adjusted position to the next, each opening 30 will come into communication with the next succeeding port 22 before breaking off communication with the preceding port 22, thereby insuring minimum transient description of the various fluid streams entering and leaving the valve through conduits 20. In the absence of this feature the resulting hydraulic shock occuring with every incremental change of valve position could cause rapid failure of the process piping, particularly when long lines and large flows are involved, and in any event would inject large repetitive upsets into the various flow control loops controlling these streams.

Rotation of the rotor 17 is accomplished by means of shaft 40, as illustrated in FIGURE 1, which shaft may be machined extension of the rotor or may be a separate element rigidly affixed to the rotor by any suitable means as by bolting, welding, shrink-fitting, etc. In the embodiment of the valve herein shown, shaft 40 extends through stator 11 and is centered and guided by roller bearing 41 and sealed by stuffing box 42; shaft 40 may further be connected to a drive shaft 44 through flexible coupling 43. Alternatively the shaft may be extended upwardly through casing 12 and be supported thereby or it may be passed horizontally through the casing and connected to the rotor through a right angle gear drive. It is contemplated that any conventional rotary driving means may be employed to effect either continuous or incremental unidirectional rotation of the rotor. For example, a ratchet and pawl mechanism operated by pneumatic or hydraulic power pistons may be used to rotate drive shaft 44, causing the rotor to move in discontinuous motions at proper intervals, or an electric motor or fluid powered turbine may be utilized; if the valve of this invention is of small size it may even be rotated manually.

It was pointed out above that a particular object of this invention is to provide a substantially plane seating surface which is perpendicular to the axis of rotation and which is operated in conjunction with a unique seating and sealing device whereby cross-port and extra-port leakage are virtually eliminated. As illustrated in FIGURE 1 an annular thrust bearing 34 is mounted on the upper face of rotor 17 or to rotor cap plate 18 if such cap plate is used. An annular member 37 is attached to the upper interior wall of casing 12, forming a ring-shaped shelf which is reinforced by a plurality of spaced gusset members 36. A plurality of circumferentially spaced compression springs 35 is interposed between shelf 37 and thrust bearing 34 whereby a downwardly directed seating force is exerted upon the rotor without hindering the rotation thereof. It is, of course, obvious that shelf 37 may be omitted, in which case springs 35 may be caused to bear directly against the upper end portion of casing 12. The compression springs serve not only to supply an initial rotor seating force but also to counteract the effect of non-uniform pressure distribution beneath rotor 17. When the valve is employed with the previously described adsorption process, each of the ports 19 is separately connected to a contacting bed and all of the beds are serially connected and have a unidirectional flow therethrough. As a consequence of the pressure drop through the beds, there will exist a pressure gradient around the lower periphery of rotor 17 which tends to exert a net torque on the rotor about some axis in the plane thereof and causes an undesirable bending or unseating action on the rotor. In order to bias out such uneven forces, one or more of the springs 35 are provided with washers 39 which place the respective springs under greater compressive stress than the remaining springs not having washers; alternatively the same result may be achieved by spacing the springs at non-uniform intervals or by appropriately replacing one or more springs with springs having a greater force coefficient. Although the illustrated arrangement of the springs is preferred, they may be oriented in any suitable manner, for example, a single spring axially or eccentrically positioned with respect to the axis of rotation may be employed. The thrust bearing and springs may even be eliminated if desired, the total seating force then being supplied by means hereinafter described.

It is contemplated that compression springs 35 will normally supply only a minor portion of the total seating force required although in some cases, for example, when the valve is used to control process streams under low pressure or vacuum, the seating force derived from the springs alone will be sufficient. In all other cases the balance of the seating force is obtained by admitting a liquid or gas under superatmospheric pressure through inlet 38 in casing 12 and maintaining a high pressure condition within the chamber formed by casing 12 and stator 11. The high pressure fluid may be obtained from the process itself or from an external source and the pressuring medium may first be passed through a pressure reducing valve prior to entering the chamber so that the casing pressure, and, therefore, the seating force maintaining the rotor in fluid-tight contact with the stator, may be closely controlled and easily adjusted. The pressuring medium selected should preferably be inert toward and readily separable from the fluid or fluids flowing through the valve. Ordinarily the process fluids contained in ports 19 and in the rotor grooves will themselves be under pressure, whence an upward force will be exerted on the rotor tending to unseat it. In order to provide the necessary seating force and to prevent extra-port leakage, it is preferred to maintain a casing pressure approximately equal to or slightly greater than the highest fluid pressure existing in any of ports 19. The slight differential pressure between the peripheral ports and the exterior of the rotor as compared to the large differential pressure between the ports and the atmosphere substantially eliminates any tendency toward extra-port leakage. Furthermore, any leakage that should occur will then be into, and not out of, the ports thereby preventing intermixing of streams within the valve, contamination of product streams with feed streams, and loss of valuable product.

A particular refinement of the rotor construction is shown in FIGURE 4. Although the present invention requires a plane bearing surface between rotor and stator, it would be impractical to attempt to maintain a perfectly flat bearing surface during operation of the valve. Stator 11 in effect forms the end closure of a chamber maintained under superatmospheric pressure and under the influence of this pressure as well as the weight of the rotor, the stator will tend to bulge downwardly slightly. Consequently, if both the stator and rotor seating surfaces are initially perfectly plane and are subsequently pressed together by the aforesaid seating forces, the seating surfaces will become slightly separated over portions of the bearing surface since the rotor, being of smaller diameter, and subjected to approximately the same pressure on the upper and lower surfaces thereof, will not undergo as much deformation as the stator. Methods of eliminating this difficulty include making the stator so thick that its elastic deformation would be negligible under the pressure imposed thereon, or providing extensive external bracing or trusswork to reinforce the stator, but such expedients exhibit the manifest disadvantage of unnecessarily increasing the massiveness and cost of fabrication of the valve. An improvement provided by the present invention is a construction taking advantage of the natural elastic deformation of the stator in effecting a tight seal between stator and rotor. It is known that the uniform load deformation of a peripherally-supported circular plate having a centrally located hole therethrough produces a conical surface symmetrically formed around the hole. In the present invention the stator, having an axial hole for the rotor shaft, may be regarded as such a plate. According to FIGURE 4 the seating surface of rotor 17 is given a conical taper between points $a$ and $b$ thereof. Taper angle $\theta$ is greatly exaggerated here for illustrative purposes and is actually substantially invisible; angle $\theta$ is sized to equal the deformation angle of the stator so that when the rotor bears upon the flat seating surface of the stator, the elastic deformation of the stator under the influence of the design seating force causes the stator seating surface to come into fluid-tight contact with the tapered seating surface of the rotor according to the above mentioned principle of deformation. The actual size of angle $\theta$ can readily be computed from known formulae and will depend upon the stator diameter, thickness, material of construction, the diameter of the axial hole, and the total force acting upon the stator. By way of example, in a valve having a carbon steel stator 31½" in diameter and 5½" thick and a 5½" diameter axial hole through the stator, a rotor taper angle $\theta$ of about 0.7 minute of arc will result in complete fluid-tight contact between stator and rotor at a casing pressure of 240 p.s.i.

It will be apparent to one skilled in the art that if for some reason the shape of the stator does not lend itself to linear deformation, as, for example, if there should be no axial hole therethrough, then the rotor seating surface should be provided with the appropriate curved surface instead of a linear taper. It should further be noted that to provide the stator seating surface with an initial matching taper would defeat the purpose of the present design since this latter configuration would suffer the same effect of unequal deformation as would two initially plane seating surfaces. The essential elements of the preferred bearing surface of this invention are a flat stator seating surface, a stator constructed of a material capable of elastic deformation and a rotor having a preformed seating surface adapted to coincide with the ultimate shape of the stator seating surface in its stressed condition. It is well known that virtually all materials of construction are capable of elastic deformation in varying degrees, including metals, plastics, glass, ceramics, etc., and therefore, such limitation on the fabrication of the stator will present no problem to the skilled artisan.

The angular spacing of rotor openings 30 will depend upon the particular process for which the valve is designed and establishes a fixed program governing the sequence in which the various feed and product streams are introduced and removed via conduits 20. Also the number of ports 19, rotor grooves, and conduits 20 may be varied by the designer to meet the needs of the contemplated process. The specific embodiment of the distributing valve illustrated in the accompanying drawings is designed for operation in conjunction with a fixed bed hydrocarbon separation process of the class previously described having twelve molecular sieve beds connected in series to form a closed flow path. Accordingly, stator 11 has twelve ports 19, each of which is connected to a bed. As shown in FIGURE 3, rotor 17 has six concentric grooves A, B, C, D, E and F connected to six peripheral openings 30 therein. The four outermost grooves A, B, C and D are connected to openings 30 which are spaced 90° apart and at all times conduct respectively a feed stream to the beds, an isohydrocarbon product stream from the beds, a desorbent stream to the beds, and a normal hydrocarbon stream from the beds. The valve is rotated incrementally and unidirectionally and may remain in each adjusted position for a period of from about ½ to about 10 minutes. Thus, the points of exit and entry of the principal streams are simultaneously advanced with each incremental movement of the valve but the three bed displacement between streams remains constant. The smaller innermost grooves E and F conduct a flushing stream which is withdrawn from the bed immediately preceding the bed to which desorbent is introduced and is injected into the conduit which has previously carried the feed stream in order to sweep out residual feed contained therein and prevent contamination of the normal product stream which is the next stream to be conducted by this conduit. It is thus seen that through continuously repeated revolutions of the valve the steady state behavior of the fixed bed process is made to approximate closely the continuous nature of a moving bed process.

Although the distributing valve of this invention has been described with reference to a specific selective adsorption process, it is emphasized that there is no intention of so limiting the utility of the invention. It is applicable to many other processes and even to many modifications of the process described. For example, such a valve is useful in processes such as catalytic reforming, catalytic cracking, etc., wherein a catalyst is employed which requires regeneration after a processing period and, therefore, must be contacted with at least the reacting fluids and the regenerating fluids and frequently purging or inert sweeping fluids to prevent mixing of various streams.

Various modifications of this invention will become apparent to those skilled in the art in the light of the foregoing disclosure. Although from a practical standpoint the valve is preferably mounted so that the plane of rotation is horizontal in order to utilize the weight of the rotor in obtaining a tight seal, it may in fact be mounted in any convenient position at the option of the user. Although the specific embodiment of the valve illustrated herein contains twelve ports and six grooves, it is not intended to limit the quantity of ports, grooves, or conduits to any specific number. If the particular adsorption process, for example, requires a greater or lesser number of contacting beds, then obviously a greater or lesser number of stator ports must be provided. Similarly, any number of rotor grooves and stator conduits may be furnished depending on the number of fluid streams to be simultaneously transferred. Also, the angular displacement between rotor openings may be symmetrical or asymmetrical and may be varied in accordance with the needs of the application. For example, if it is desired to have a six bed adsorbing zone and a two bed desorbing zone, spacing the appropriate openings 6 ports apart and 2 ports will automatically result in this program.

The preferred arrangement of ports and grooves is that the grooves be disposed interior to the ports since there will usually be a greater number of ports than grooves and more physical space is available on circles of greater circumference; however, it would not be a departure from the scope of this invention to provide the converse, that is, to arrange the stator ports interior to the grooves, the latter then being disposed around the periphery of the rotor. While the ports and conduits have been shown as extending more or less vertically through the stator, they may equally well undergo a change of direction within the stator body and extend radially outward therethrough. The rotor grooves have been described as concentrically spaced and the ports and conduits have likewise been described as being located on various concentric circles. It is, of course, obvious that the geometrical relationships therebetween need only be approximate for the purposes of this invention which are to establish certain fluid flow paths in accordance with a periodic sequence determined by the valve construction; substantial departures from exact concentricity or exact circularity of the grooves and spacing of the ports and conduits may be tolerated without destroying the operability of the valve or removing it from the spirit of this invention.

In view of the foregoing specification it will be appreciated that the grooves may be disposed in the stator instead of in the rotor in which case the lining, if one is used, will preferably comprise the rotor seating surface instead of the stator seating surface. In this case a thin rotor might be used which, under the influence of a net downward pressure, would easily deflect sufficiently to stay in contact with the deflected stator.

We claim as our invention:

1. A valve comprising a stator having a single substantially flat first seating surface, a rotor having a second seating surface in fluid-tight contact with said first seating surface, a plurality of concentric circular grooves formed in one of said first and second seating surfaces and centered on the axis of rotation of said rotor, a plurality of passageways corresponding in number with said circular grooves formed within the rotor, each passageway terminating at one end thereof in an opening in said second seating surface, thereby forming a plurality of openings in said second seating surface which are spaced around said axis of rotation, and each of said passageways at the other end thereof being in continuous fluid communication with a corresponding circular groove in all positions of said rotor, a plurality of ports extending through said stator and spaced around said axis of rotation so that each of the ports is in fluid flow communication with each of said openings at some point in the rotation of the rotor and each opening is in fluid flow communication with only one port for any adjusted position of the rotor, and fluid-conveying means in constant fluid communication with each of said grooves and extending therefrom through said stator to the exterior thereof.

2. A valve comprising a stationary plate having a single substantially flat seating surface, a rotor in fluid-tight contact with said seating surface forming a single bearing surface substantially perpendicular to the axis of rotation of said rotor, a plurality of concentric circular grooves formed in the bearing surface of the rotor contacting said plate and centered on said axis of rotation, a plurality of openings corresponding in number with said circular grooves formed in said rotor bearing surface and spaced around said axis of rotation, passageways within the rotor each connecting one of said grooves with a corresponding opening, a plurality of ports extending through said plate and spaced around said axis of rotation so that each of said ports is in fluid flow communication with each of said openings at some point in the rotation of the rotor and each opening is in fluid flow communication with only one port for any adjusted position of the rotor, and fluid-conveying means in constant fluid communication with each of said grooves in the rotor bearing surface and extending therefrom through said plate to the exterior thereof.

3. A valve comprising a stationary plate having a single substantially flat seating surface, a rotor in fluid-tight contact with said seating surface forming a single bearing surface substantially perpendicular to the axis of rotation of said rotor, a plurality of concentric circular grooves formed in the bearing surface of the rotor contacting said plate and centered on said axis of rotation, a plurality of openings corresponding in number with said circular grooves formed in said rotor bearing surface and spaced around said axis of rotation, passageways within the rotor each connecting one of said grooves with a corresponding opening, a plurality of ports extending through said plate and spaced around said axis of rotation so that each of said ports is in fluid flow communication with each of said openings at some point in the rotation of the rotor and each opening is in fluid flow communication with only one port for any adjusted position of the rotor, fluid-conveying means in constant fluid communication with each of said grooves in the rotor bearing surface and extending therefrom through said plate to the exterior thereof, and seating means for applying to said rotor and maintaining thereon a seating force in a direction normal to said bearing surface.

4. The valve of claim 2 further characterized in that the shape, size, and position of said openings in the rotor bearing surface are so proportioned and placed that for any unadjusted position of the rotor each opening is in fluid flow communication with a least one port of two adjacent ports.

5. The valve of claim 2 further characterized in that said fluid conveying means comprises two conduits both extending from one of said circular grooves through said plate to the exterior thereof, said two conduits being spaced at least 90° apart.

6. The valve of claim 2 further characterized in that said bearing surface comprises a lining of solid autolubricant.

7. The valve of claim 3 further characterized in that said seating means comprises a casing enclosing said rotor and maintained in fluid-tight contact with said stationary plate, said casing having a perforation through which a fluid under pressure is introduced.

8. The valve of claim 7 further characterized in that said rotor is pressed against said plate by a force exerted by a spring seated at one end on the rotor and at the other end on said casing.

9. The valve of claim 8 further characterized in that said spring is radially displaced from said axis of rotation.

10. The valve of claim 8 further characterized in that an annular thrust bearing is provided on the face of the rotor opposite said bearing surface and a plurality of circumferentially spaced compression springs is disposed between and compressively abuts said casing and said thrust bearing.

11. A valve comprising a rotor having a conically tapered seating surface, a stator having a substantially flat seating surface adjacent and conformable to the tapered seating surface of the rotor, seating means for applying to said rotor and maintaining thereon a seating force normal to said flat seating surface and of such magnitude that the rotor bears upon said flat surface and causes resilient deformation thereof to bring said stator seating surface into fluid-tight contact with said rotor seating surface, a plurality of concentric circular grooves formed in said tapered surface and centered on the axis of rotation of said rotor, a plurality of openings corresponding in number with said circular grooves formed in said tapered surface and spaced around said axis of rotation, passageways within the rotor each connecting one of said grooves with a corresponding opening, a plurality of ports extending through said stator and spaced around said axis of rotation so that each of said ports is in fluid flow communication with each of said openings at some point in the rotation of the rotor and each opening is in fluid flow communication with only one port for any adjusted position of the rotor, and a conduit extending from each of said grooves in the rotor seating surface through said stator to the exterior thereof, each of the resulting plurality of conduits being in constant communication with its respective groove.

12. The valve of claim 10 further characterized in that at least one but less than all of said springs seats upon a spring-biasing member disposed at one end thereof.

13. A valve comprising a rotor having a frustro-conical seating surface, a stator having a substantially flat seating surface abutting the flat portion of said frustro-conical seating surface, seating means for applying to said rotor and maintaining thereon a seating force acting in a direction to urge the rotor seating surface against the stator seating surface, said seating force being transmitted to the flat stator seating surface through said flat portion of the rotor seating surface and resiliently deforming the stator seating surface into fluidtight contact with the rotor seating surface, a plurality of concentric circular grooves formed in the rotor seating surface and centered on the axis of rotation of the rotor, a plurality of openings corresponding in number with said circular grooves formed in the rotor seating surface and spaced around said axis of rotation, passageways within the rotor each connecting one of said grooves with a corresponding opening, a plurality of ports extending through said stator and spaced around said axis of rotation so that each of said ports is in fluid flow communication with each of said openings at some point in the rotation of the rotor and each opening is in fluid flow communication with only one port for any adjusted position of the rotor, and a conduit extending from each of said grooves in the rotor seating surface through said stator through the exterior thereof, each of the resulting plurality of conduits being in constant fluid communication with its respective groove.

14. A valve comprising a rotor having a frustro-conical seating surface, a stator having a substantially flat seating surface abutting the flat portion of said frustro-conical seating surface, a casing enclosing said rotor and maintained in fluid-tight contact with said stator, said casing having a perforation through which a fluid under pressure is introduced, an annular thrust bearing rotatably disposed upon the face of the rotor opposite said frustroconical seating surface, a plurality of circumferentially spaced compression springs disposed between and compressively abutting said casing and said thrust bearing, said springs and said fluid pressure producing a seating force acting upon the rotor in a direction to urge the rotor seating surface against the stator seating surface, said seating force being transmitted to the flat stator seating surface through said flat portion of the rotor seating surface and resiliently deforming the stator seating surface into fluid-tight contact with the rotor seating surface, a plurality of concentric circular grooves formed in the rotor seating surface and centered on the axis of rotation of the rotor, a plurality of openings corresponding in number with said circular grooves formed in the rotor seating surface and spaced around said axis of rotation, passageways within the rotor each connecting one of said grooves with a corresponding opening, a plurality of ports extending through said stator and spaced around said axis of rotation so that each of said ports is in fluid flow communication with each of said openings at some point in the rotation of the rotor and each opening is in fluid flow communication with only one port for any adjusted position of the rotor, said openings having such shape, size, and position that for any unadjusted position of the rotor each opening is in fluid flow communication with at least one of two adjacent ports, and a conduit extending from each of said grooves in the rotor seating surface through said stator to the exterior thereof, each of the resulting plurality of conduits being in constant fluid communication with its respective groove.

References Cited in the file of this patent

UNITED STATES PATENTS

| | | |
|---|---|---|
| 881,575 | Gulke | Mar. 10, 1908 |
| 963,470 | Du Pont | July 5, 1910 |
| 2,111,169 | Clark | Mar. 15, 1938 |
| 2,186,657 | Saussure | Jan. 9, 1940 |
| 2,706,532 | Ringo | Apr. 19, 1955 |
| 2,735,645 | Freed | Feb. 21, 1956 |
| 2,741,265 | Poor | Apr. 10, 1956 |
| 2,918,938 | Kimball | Dec. 29, 1959 |